Feb. 18, 1958  O. NUSSER, JR  2,823,703
FLEXIBLE PIPE
Filed July 26, 1955  2 Sheets-Sheet 1
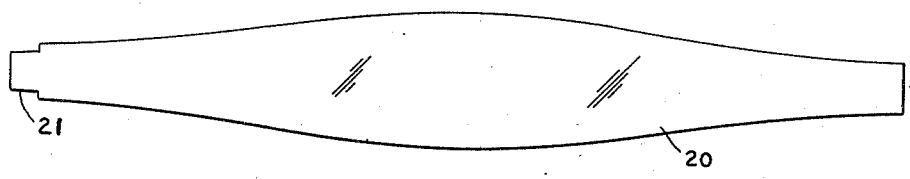
FIG. 1
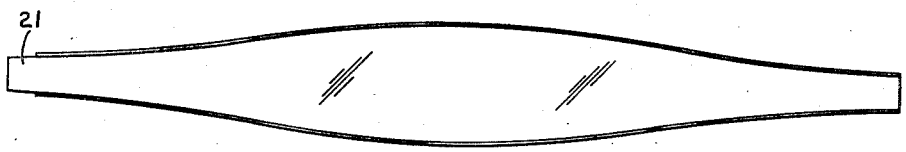
FIG. 2
FIG. 3
FIG. 4
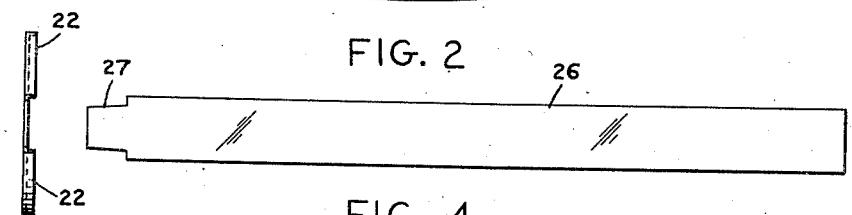
FIG. 5
FIG. 6
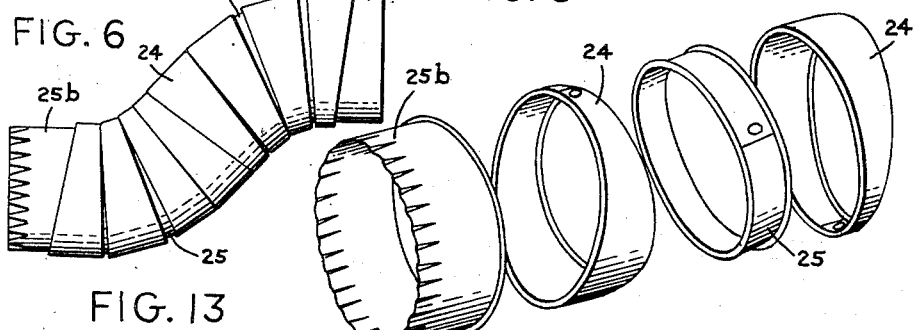
FIG. 13
FIG. 7
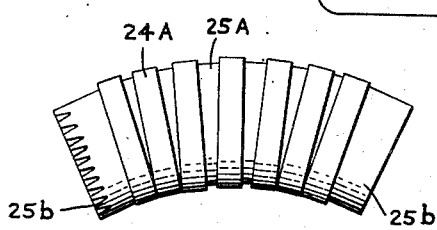
FIG. 18
INVENTOR.
Otto Nusser, Jr.
BY
Roy Griffith Jones Feb. 18, 1958  O. NUSSER, JR  2,823,703
FLEXIBLE PIPE
Filed July 26, 1955  2 Sheets-Sheet 2

INVENTOR.
Otto Nusser, Jr.
BY Roy Griffith Jones

United States Patent Office 2,823,703
Patented Feb. 18, 1958

2,823,703

FLEXIBLE PIPE

Otto Nusser, Jr., Newark, N. J.

Application July 26, 1955, Serial No. 524,465

1 Claim. (Cl. 138—52)

This invention relates to flexible air ducts for heating and air conditioning systems.

It is well known to heating and air conditioning contractors that various building constructions and equipment constitute obstacles to the installation of air ducts, and that with the means at present available it is difficult and time-consuming to install air ducts, due to such obstacles. The usual 45° and 90° elbow, for example, are not adequate for many situations, especially to do a first-class job. I have therefore invented an air duct or duct component which is adapted to be readily bent arcuately into a wide variety of forms, so that it readily goes around or avoids the mentioned obstacles, or, in other words, a flexible pipe. Moreover, this is accomplished without bending its elements; the pipe bends, but its parts do not, maintaining their form regardless of the curvature given the duct. The accompanying drawings show short pipes, such being suitable to avoid most obstacles, but it is to be understood that pipes of any length may be made according to my invention. And while they are shown as being made of sheet metal, the invention is not confined to such use.

In the drawings:

Figure 1 is a plan view of an oppositely tapered strip of sheet metal to be made into a ring, the ends to be secured together;

Figure 2 is a view similar to Figure 1 after flanges have been formed at its sides;

Figure 3 is an end view of Fig. 2;

Figure 8:
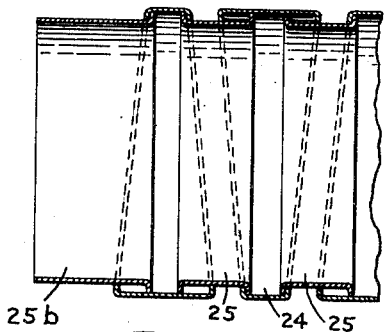
Figure 9:
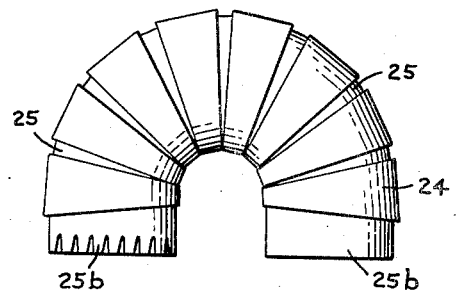
Figure 10:
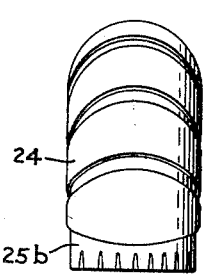
Figure 11:
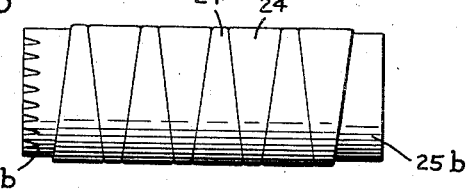
Figure 12:
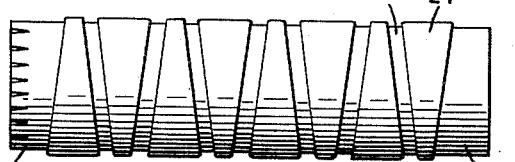
Figure 14:
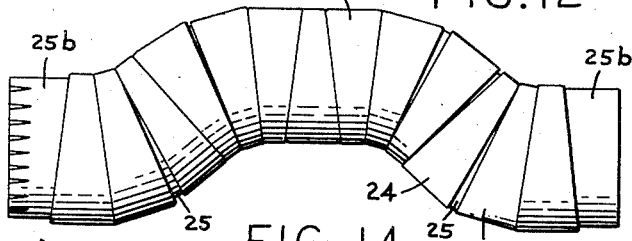
Figure 15:
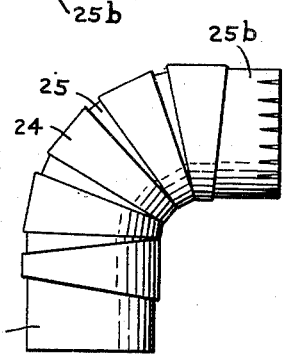
Figure 16:
Figure 17:
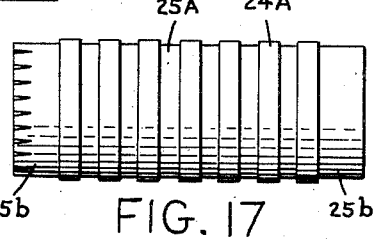

Figures 4 and 5 are views corresponding respectively to Figs. 1 and 2, but in Figs. 4 and 5 the strips are of uniform width, being formed into straight pipe sections which are to interlock and alternate with ring bands formed from strips shown in Fig. 2;

Figure 6 is an end view of Fig. 5;

Figure 7 is an exploded view of a pipe or part thereof, showing perspectively the constituent parts;

Figure 8 is a fragmentary longitudinal section of pipe or part thereof, showing the connection of the constituents;

Figure 9 shows how a pipe of my invention may be bent into a semi-circular form of small radius;

Figure 10 is an end view of Fig. 9;

Figure 11 is a view showing the pipe of Fig. 9 straightened out and collapsed to its shortest length;

Figure 12 is a view similar to Fig. 11 but shows the pipe lengthened out;

Figures 13, 14, and 15 show different formations which the pipe may be made to assume;

Figure 16 is a plan view of a modified form, in which the ring bands are of uniform width, being made from strips as shown in Figs. 4 and 5. This view shows the pipe collapsed to its shortest length;

Figure 17 is a view similar to Fig. 16 but shows the pipe lengthened out; and

Figure 18 shows the pipe of Fig. 17 bent into an arcuate form.

Referring to the drawings for a more detailed description thereof, Fig. 1 shows a strip of sheet metal 20, symmetrically and oppositely tapered from its widest part, except for a tongue 21 at one end, and being also longitudinally symmetrical, the sides being arcuate on a reverse curve, changing from a convex curve at the widest part to a slightly concave one. Flanges 22 are formed at the sides of strip 20, and the flanged strip is later formed into a ring 24, with the flanges extending inwardly, which ring may be called a band ring, the tongue 21 lapping the opposite end and snugly fitting in between the flanges, the joint subsequently, during assembly of the pipe components, being riveted, as shown, or soldered, any required number of such rings being similarly made. To alternate and interlock with band rings 24, pipe sections 25 are formed from elongate rectangular strips 26, of uniform width, illustrated in Fig. 4, and having tongues 27 at one end. Flanges 28 are formed at the sides of strip 26 as shown in Figs. 5 and 6, and the flanged strips are then formed into circular pipe sections, with the flanges extending outwardly, the tongues 27 overlapping the opposite end portions and fitting snugly between the flanges 28, and riveted to the opposite end portions of the strips. A plurality of sections 25 and rings 24 are then connected together telescopically and alternately as shown in Fig. 8, the rings being exterior to the flanges of the sections, it being understood that the rings, not yet secured at their ends, are opened up and placed around the sections and then riveted, thus interlocking the rings and the sections. The rings and sections are thus held to each other by their flanges, their corresponding flanges being opposed or adjacent and adapted to contact the inwardly extending flanges of the rings slidably contacting the outer periphery of the sections. The peripheral diameter of the rings is thus slightly larger than that of the sections. There is enough looseness in their connection to permit more or less telescoping, as required in manipulating the assembled components into different shapes, as shown, for example in Figs. 9, 11, 13, 14 and 15. These figures show some, but not all, of the many forms which a short length of pipe may be made to assume. And of course, the longer such a pipe, the greater the number forms possible. The various shapes or forms of the pipe may be attained by turning the tapered band rings to different relative positions. It may be noted from Figs. 11 and 12, for example, that for the straight form of the pipe, adjacent rings are in opposing positions, i. e., the widest part of one ring is in the same position as the narrowest part of the ring next to it, alternate rings being in the same relative position. In Fig. 11, the pipe is collapsed, that is, the rings are pushed into contact with each other, covering up the inner sections. Fig. 12 shows the rings in the same relative position as in Fig. 11, but the pipe is pulled out, the adjacent rings separated as far as allowed by the retaining flanges. As an opposite condition to the pipe in its straight form, Fig. 9 shows it bent into semi-circular form in which case the band rings are in the same relative position. It may be added that an end section 25 has only one flange, which is on the inner end, the outer end being crimped to render it easily insertable into the usual plain pipe, as shown in Figs. 7, 13, 14 and 15.

A modified form of the invention is shown in Figs. 16, 17, and 18. This form is also flexible, but not so flexible as the form previously described. For example, in bending it entirely into a curve, the smallest radius of curvature is larger than in the previous form. In the modification, the sections 25A are of the same construction as in the previous form, but the band rings 24A are of uniform width. Otherwise the construction is the same as described for the previous form. In both forms, the end sections 25b are longer than the interior sections in order to provide for connections to adjacent piping and are flanged only at their inner ends. In order to assemble the components of this form of pipe, the mentioned sections, already riveted or soldered, are lined up, and the band rings, not yet soldered or riveted at their ends, are opened and placed around two adjoining sections as described, and then riveted or soldered.

The following dimensions are given for the components mentioned, as applied to a pipe 4 inches in diameter. For the first form described, the tapered rings may be about 1⅞ inches wide at their widest part and ⅝ inch at their narrowest, while the tubular sections are about ¾ inch long. In the modified form, the sections are about 1 inch long and the band rings are about ⅞ inch uniform width.

What is claimed is:

A flexible pipe comprising a plurality of relatively short straight tubular components individually rotatable and connected endwise in series and adapted to have a limited relative sliding movement for lengthening and shortening the pipe, each of said components having a uniform diameter throughout its length, alternate components having a uniform length and the intermediate components having a tapered length, said components having retaining flanges at their ends, the flanges of alternate components being inturned and the flanges of the intermediate components being outturned, the flanges of each component being disposed between the flanges of adjacent components to enable each component to be moved on adjacent components in a lengthwise direction.

References Cited in the file of this patent

UNITED STATES PATENTS

| | | |
|---|---|---|
| 634,169 | Greenfield | Oct. 3, 1899 |
| 1,255,577 | Berry | Feb. 5, 1918 |
| 2,209,239 | Sterzenbach | July 23, 1940 |

FOREIGN PATENTS

| | | |
|---|---|---|
| 334,398 | Italy | Jan. 24, 1936 |